3,238,197
19-NOR-20-SPIROXA-4,9(10)-DIEN-3-ONE, THE CORRESPONDING 3,21-DIONE AND INTERMEDIATES THEREFOR
Glen E. Arth, Cranford, N.J., assignor to Merck & Co. Inc., Rahway, N.J., a corporation of New Jersey
No Drawing. Filed Mar. 19, 1964, Ser. No. 353,285
6 Claims. (Cl. 260—239.55)

This invention relates generally to novel steroids and processes of preparing the same. More particularly, it relates to novel 19-nor-20-spiroxa-4,9(10)-dien-3 - one and the corresponding 3,21-dione, intermediates useful in their preparation and processes by which these novel compounds are prepared. The final products of this invention possess useful properties as aldosterone inhibitors.

The name "20-spiroxane" is used to designate compounds having the following ring structure:

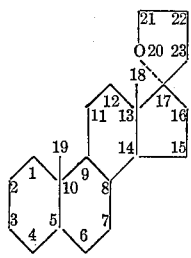

Accordingly the products of this invention have the following structural formulas:

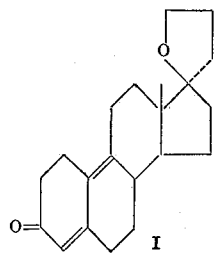 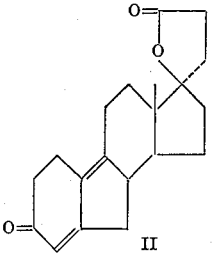
       I                      II

In the presently preferred process for preparing the compounds of this invention 5-enes corresponding to products I and II are reacted with pyridinium bromide perbromide. The reaction may be represented by the following reaction sequence which shows only the preparation of compound I.

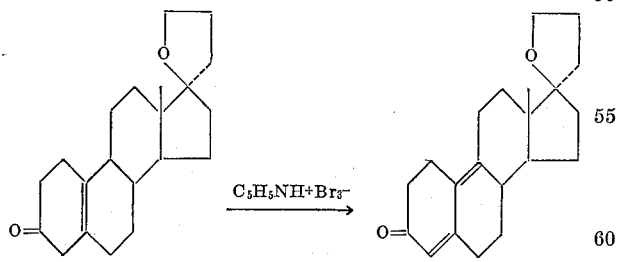

The starting compound for the above reaction is 19-nor-20-spirox-5(10)-en-3 - one. It is prepared from 3-alkoxy-19-nor-20-spirox-2,5(10) - diene which is preferably utilized as the methoxy compound. This compound in turn is prepared from 3-methoxy-17α-(3-hydroxypropyl)-1,3,5(10)-estratrien-17β-ol through an intermediate lactone.

In the preparation of the starting compound 3-methoxy-17α-(3-hydroxypropyl) - 1,3,5(10) - estratrien - 17β-ol is reacted with an organic sulfonyl halide, such as methane sulfonyl chloride, benzene sulfonyl chloride or p-toluene-sulfonyl chloride in the presence of an organic base, such as pyridine, at room temperature to give 3-methoxy-19-nor-20-spirox-1,3,5(10)-triene.

Upon treatment of the foregoing triene with an alkali metal such as sodium or lithium in anhydrous ammonia in an anhydrous solvent such as tetrahydrofuran which any contain a lower alkanol, there is formed 3-methoxy-19-nor-20-spirox-2,5(10)-diene which on treatment with an acidic reagent, for example aqueous oxalic or acetic acid is converted to the preferred starting compound.

The above described series of reactions may be represented as follows:

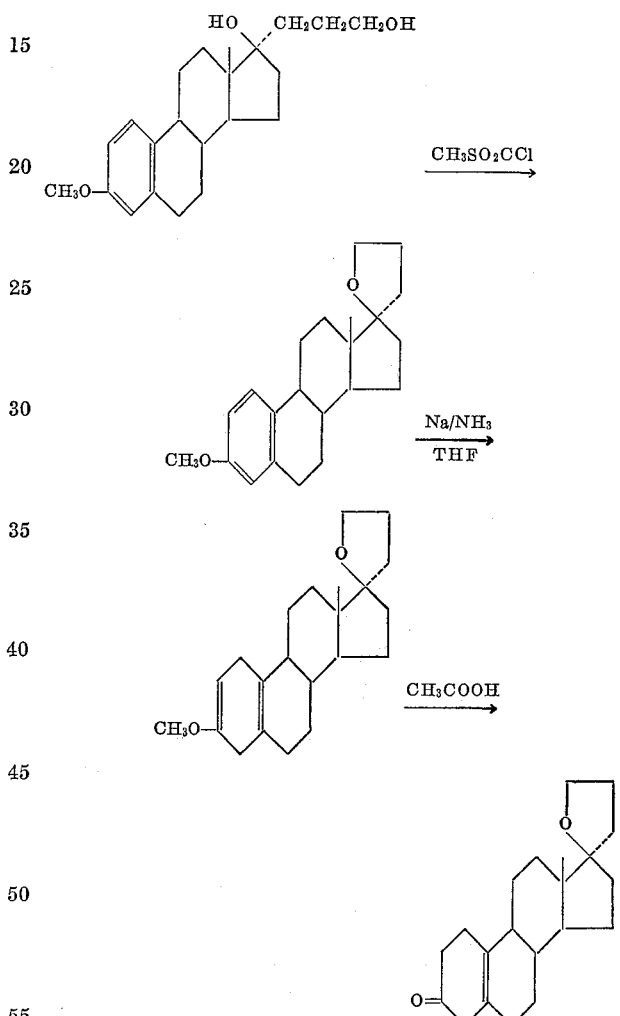

The presently preferred starting compound for the preparation of 19-nor-20-spiroxa-4,9(10) - diene - 3,21-dione is 19-nor-20-spirox-5(10)-en-3,21 - dione. Treatment of this compound with pyridinium bromide perbromide yields compound II.

The starting compound is prepared from an alkali metal salt, preferably the sodium salt of 3-[3-methoxy-17β-hydroxy-2,5(10)-estradien-17α-yl] propanoic acid by treatment with an acid, suitably acetic acid. The reaction produces a mixture of the preferred starting compound and the novel intermediate 3-[3-oxo-17β-hydroxy-5(10)-estren-17α-yl]-propanoic acid. If desired the mixture can be separated. Alternatively the mixture can be treated with pyridinium bromide perbromide and the reaction product, which is a mixture of the desired compound and the novel intermediate 3-[3-oxo-17β-hydroxy-4,9(10)- estradien-17α-yl] - propanoic acid, treated with acid to lactonize the propanoic acid compound.

The sequence of reactions may be represented as follows:

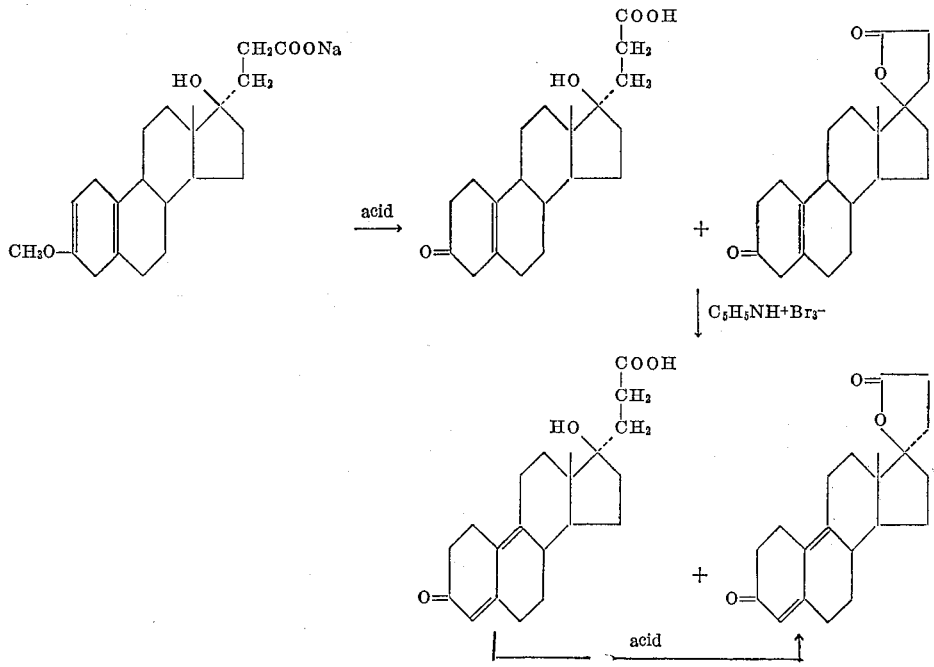

The biologically active products of this invention are aldostreone antagonists useful in the treatment of edema. When used as diuretics, they are administered in dosages of approximately the same order of magnitude as other steroid agents often recommended for these purposes such as spironolactone. They may be used in combination with other diuretics such as thiazides and mecurials with beneficial results.

The biologically active compounds of this invention may be administered alone or in combination with pharmaceutically acceptacle carriers. The choice of carriers is determined by the route of administration and standard pharmaceutical practice. For oral administration, the compounds may be administered in the form of tablets or capsules containing excipients such as starch or milk sugar. Aqueous compositions and elixirs which may be sweetened or flavored may also be employed.

The following examples are given by way of illustration only and are not intended as limitations of this invention many apparent variations of which are possible without departing from the spirit and scope thereof.

Preparations 1 through 3 illustrate the preparation of starting compounds in accordance with the preferred process of this invention.

PREPARATION 1

*3-methoxy-19-nor-20-spirox-1,3,5(10)-triene*

To 3 g. of 3-methoxy-17α-(3-hydroxypropyl)-1,3,5(10)-estratriene -17β-ol in 7 ml. of pyridine is added 2 g. of p-toluenesulfonyl chloride. The solution is stirred for 16 hours at room temperature. Water is then added dropwise until crystals appear. The crystals are collected on a filter and washed with water to yield 2.88 g. of 3-methoxy-19-nor-20-spirox - 1,3,5(10) - triene, melting at 113–120° C.

PREPARATION 2

*3-methoxy-19-nor-20-spirox-2,5(10)-diene*

A solution of 0.0175 mole of 3-methoxy-19-nor - 20-spirox-1,3,5(10)-triene in a mixture of 75 ml. of dry t-butanol and 75 ml. of dry tetrahydrofuran is added over 30 minutes with stirring to 120 ml. of dry liquid ammonia. Sodium (6.9 g.) is then added in small pieces over a period of one hour at −25° C. to −40° C. After about an hour, the metal is consumed as indicated by the loss of blue color and 2.0 ml. of anhydrous methanol is cautiously added. The ammonia is allowed to evaporate spontaneously through a mercury trap which excludes air. The pressure in the system is reduced to approximately 10 mm. of mercury and held for 30 minutes. Distilled water (125 ml.) is added cautiously with brisk stirring. The t-butanol and tetrahydrofuran are distilled off at 40° C. and 10 mm. of mercury pressure. An additional 125 ml. of water is added and distillation continued until all of the organic solvent has been removed. The residual mixture is cooled in a nitrogen atmosphere whereupon the desired product precipitates.

The product is recovered by filtration, washed with oxygen free water and dried. For purification, it is recrystallized from methanol. Purification is not essential however, for conversion into the product of Preparation 3.

PREPARATION 3

*19-nor-20-spirox-5(10)-en-3-one*

The product obtained in Preparation 2 is taken up in a mixture of 35 ml. of ethanol, 12 ml. of water and 70 ml. of glacial acetic acid. The mixture is stirred at room temperature in a nitrogen atmosphere for 24 hours. It is then diluted with 2.4 liters of ice cold water and extracted with two 400 ml. portions of ether. The combined ether extracts are washed with two 100 ml. portions of water and successively with two 50 ml. portions of saturated aqueous sodium bicarbonate and two 100 ml. portions of water. After drying over anhydrous sodium sulfate, the ethereal solution is concentrated to a syrup in vacuo to leave the desired product which is purified by chromatography over silica gel using ether:petroleum ether initially at 1:1 and with increasing quantities of ether. The product may be recrystallized from methanol.

EXAMPLE 1

*19-nor-20-spirox-5(10)-ene-3-21-dione* and

*3-[3-oxo-17β-hydroxy-5(10)-estren-17α-yl] propanoic acid*

A mixture containing 0.0175 mole of the sodium salt of 3-[3-methoxy-17β-hydroxy - 2,5(10)-estradien-17α-yl] propanoic acid in 35 ml. of ethanol, 12 ml. of water and 70 ml. of glacial acetic acid is stirred at room temperature in a nitrogen atmosphere for 24 hours. The reaction mixture is diluted with 2.4 liters of ice cold water and extracted with two 400 ml. portions of ether. The combined ether extracts are washed successively with two 100 ml. portions of water, two 50 ml. portions of saturated aqueous sodium bicarbonate and finally with two 100 ml. portions of water. After drying over anhydrous sodium sulfate the ethereal solution is concentrated in vacuo to leave a mixture of the desired products which are separated chromatographically.

EXAMPLE 2

19-nor-20-spiroxa-4,9(10)-dien-3-one

A solution of 0.0255 mole of 19-nor-20-spirox-5(10)-en-3-one in 250 ml. of anhydrous pyridine is prepared under nitrogen and cooled to —5° C. with stirring. A solution of 0.0255 mole of pyridinium bromide perbromide in 100 ml. of anhydrous pyridine is then added to the steriod solution over a 15 minute period, the temperature being kept at —5° C. to 0° C. for three hours. The temperature is then allowed to rise to 20° C. and the mixture left standing under nitrogen for about 16 hours. The reaction mixture is then poured into 2.5 liters of ice water and extracted with four 200 ml. portions of methylene chloride. The combined extracts are then washed successively with 2 x 100 ml. of water, 2 x 300 ml. of 2 N hydrochloric acid, 2 x 100 ml. of water, 1 x 100 ml. of saturated aqueous sodium bicarbonate and 2 x 100 ml. of water. After drying over anhydrous sodium sulfate and filtering, the solvent is evaporated in vacuo to about 30 ml. At this point 50 ml. of anhydrous ether is added and the mixture evaporated at atmospheric pressure to about 20 ml. An equal portion of ether is added and the evaporation process repeated to a volume of 30 ml. so as to replace the methylene chloride with ether. The mixture is then allowed to stand at 10° C. for about 16 hours to precipitate the desired product which is recovered by filtration.

The procedure is utilized to prepare 19-nor-20-spiroxa-4,9(10)-diene-3,21-dione and 3-[3-oxo-17β-hydroxy-4,9(10)-estradien-17α-yl]-propanoic acid from the products prepared in Example 1. In the latter case the washing with aqueous sodium bicarbonate is omitted.

EXAMPLE 3

19-nor-20-spiroxa-4,9(10)-diene-3,21-dione

A mixture of 19-nor-spirox-5(10)-ene-3,21-dione and 3-[3-oxo-17β-hydroxy - 5(10) - estren - 17α-yl] propanoic acid prepared as described in Example 1 omitting the separation step is taken up in 200 ml. of anhydrous pyridine under nitrogen and cooled to —5° C. with stirring. A solution of 0.0175 mole of pyridinium bromide perbromide in 100 ml. of anhydrous pyridine is added over a 15 minute period while maintaining the temperature at —5° C. to 0° C. The reaction mixture is aged at 0° C. for three hours. The temperature is then allowed to rise to 20° C. and the mixture allowed to stand for about 16 hours under nitrogen. The mixture is then evaporated to dryness at 40° C. and 5 mm. of mercury. The residue is dissolved in 50 ml. of ethanol and diluted with 50 ml. of 6 N hydrochloric acid. It is then heated on a steam bath for one hour, cooled and the ethanol removed in vacuo on the steam bath. The cooled reaction mixture is diluted with 250 ml. of water and the mixture extracted twice with 100 ml. portions of methylene chloride. The combined extracts are washed twice with 50 ml. portions of water and evaporated to leave the desired product as a residue. It is purified by chromatography over silica gel using ether:petroleum ether as described in Preparation 3.

What is claimed is:
1. 19-nor-20-spiroxa-4,9(10)-diene-3-one.
2. 19-nor-20-spiroxa-4,9(10)-dien-3,21-dione.
3. 3-[3-oxo-17β-hydroxy - 5(10)-estren-17α-yl] propanoic acid.
4. 3-[3-oxo-17β-hydroxy - 4,9(10) - estradien - 17α-yl] propanoic acid.
5. A process for the preparation of 19-nor-20-spiroxa-4,9(10)-diene-3-one which comprises reacting 19-nor-20-spirox-5(10)-en-3-one with pyridinium bromide perbromide.
6. A process for the preparation of 19-nor-20-spiroxa-4,9(10)-dien-3,21-dione which comprises reacting 19-nor-20-spirox-5(10)-ene-3,21-dione with pyridinium bromide perbromide.

No references cited.

LEWIS GOTTS, *Primary Examiner.*